April 7, 1959
E. G. ANGER
2,881,374
MOTOR CONTROL SYSTEM
Filed Jan. 25, 1956
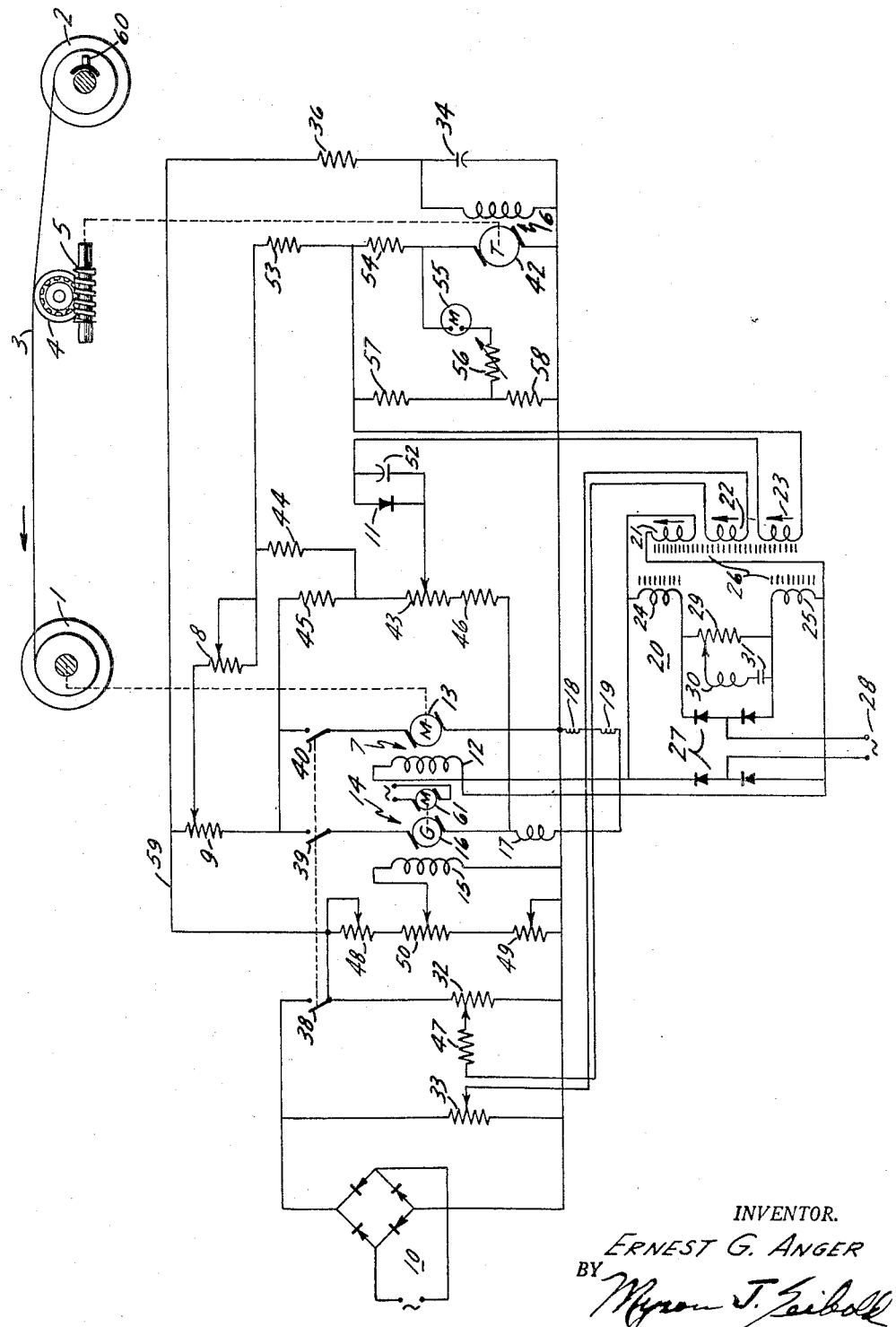
INVENTOR.
ERNEST G. ANGER
BY United States Patent Office 2,881,374
Patented Apr. 7, 1959

2,881,374

MOTOR CONTROL SYSTEM

Ernest G. Anger, Wauwatosa, Wis., assignor to Square D Company, Detroit, Mich., a corporation of Michigan Application January 25, 1956, Serial No. 561,214

15 Claims. (Cl. 318—6)

The present invention relates to a motor control system and more particularly, to a motor control system for regulating the torque and speed of a motor in a feedback control circuit.

In general the invention is directed to a measurement system in which the driving force provided by the element being measured does not have adequate speed or torque to drive a transducer, e.g., tachometer generator, Selsyn or other mechanical arrangement. Provision is therefore made for sufficient variation of power within the transducer to overcome at least its own losses and those of the coupling linkage so that the driving source or element absorbs power by retardation of the transducer. A stepup in speed ratio between the element and transducer by the mechanical linkage permits a minimum of force by the element, due to magnification of mechanical losses at the high end of the linkage, to control the speed of the transducer.

The measurement system is incorporated in a feedback circuit or closed loop control system to control the speed by controlling the field of a motor driving the element. The reference voltage provided for comparison with the feedback voltage from the transducer, is a portion of the driving motor armature voltage, compensated for current used in the transducer to produce torque to drive the mechanical linkage and for its own losses for proper comparison of transducer voltage resulting from speed measurement with counter E.M.F. voltage or speed of the motor driving the element. Compensation is provided for variations in line speed or speed of operation of the system in the transducer supply circuit providing a source varying with driving motor speed. Minimum and idle safety field control is introduced in the amplification control for the field from the excitation supply source.

In the present system, the amplification control is limited in range of operation to the element's range of speeds plus the speed change of the driver motor to maintain the element at a constant speed at a given element speed. Maintaining the amplification controller within its limited range requires elimination of IR voltage drops in the coiler motor from the regulating circuit. The reference voltage therefore has been derived from a circuit compensation for IR drops of the driver motor so that only the counter E.M.F. without IR voltage drops are reflected in the reference voltage. IR voltage drops will effect the regulation if permitted to vary the reference voltage upon an increased load or at slower speeds of operation where the IR voltage drop is high in proportion to the counter E.M.F. It is therefore an object of the present invention to provide a measurement system for motor control in accordance with the foregoing features.

Another object is to provide a measurement system having a source of power supplying a transducer to furnish a driving force to a transducer but compensated to convert the speed of the element into a signal voltage.

A further object of the invention is the provision of a variation of power supplied to a transducer in a measurement system to overcome at least its own losses and those of a coupling linkage connecting the transducer to an element to be measured, wherein the element absorbs power by retardation of the transducer.

Still another object is to provide a transducer system in which a transducer is coupled to an element, the speed of which is to be measured, by a mechanical linkage having increasing losses upon being loaded, stepping up the speed ratio between the element and the transducer, so that a minimum force is required by the element to control the speed of the transducer.

A still further object of the present invention is the provision of a motor regulator circuit controlling the field by a signal voltage transmitted from a transducer having a driving force independent of an element, the speed of which is being measured by the transducer.

Another object is to provide a supply circuit for a measurement system in a motor control circuit in which the reference voltage is compensated for the current used to drive the transducer and mechanical linkage for proper comparison of transducer voltage resulting from speed measurement.

Still another object is to provide automatic compensation in the supply of driving power to the transducer over the range of operating speeds of a driven motor.

A still further object of the present invention is the provision of IR compensation in a reference voltage to avoid regulation resulting from IR voltage drops.

Another object is to provide compensation in the power supply circuit of a transducer for maintaining torque output regardless of speed changes.

A further object of the invention is the provision of a circuit in a motor control system for obtaining compensation for power applied to a transducer to produce torque to obtain a true regulating signal.

Still another object is to provide a speed indicator furnishing the true speed signal voltage which is not effected by power applied to the transducer for generating torque.

A still further object of the invention is the provision of a motor regulator circuit insuring minimum conduction to the motor field in the absence of a regulating signal.

Still another object is to provide a motor control circuit which is independent of its coupling to the element to be regulated wherein the regulating signal will increase to decrease the speed of the controlled motor.

Further objects and features will be readily apparent to those skilled in the art from the specification and appended drawing illustrating the preferred embodiment in which the measurement and regulation of a length of material 3 is controlled by a roller 4 mechanically coupled to a tachometer or D.C. motor 6. In this application of the circuit a wide range of material speed operation, e.g., 20 to 100 f.p.m. (feet per minute) was desired, requiring stepup gearing from the measuring roll 4 contacting the length of moving material 3, to insure adequate regulating signal voltage at the lowest speed of operation. In this instance, as is common in systems of this type, insufficient pressure of contact was available between the material 3 and the measuring roll 4 for driving a tachometer generator, Selsyn or other mechanical transducer through gears or other mechanical linkage. To provide for this condition, a tachometer motor 6 was provided with sufficient power to overcome its own losses and those of the coupling linkage and wherein the driving source or measurement roll absorbs power by retardation of the transducer.

Further, in accordance with this system for motoring or supplying power to a D.C. or other type of mechanical transducer, wherein the strength of the field of the motor controlling the windup roll is dependent upon a regulating signal to prevent a runaway condition, an electrical or other driving torque independent of its coupling system is provided whereby the regulating signal produced by the tachometer motor 6 will increase in stretch upon failure of the coupling means; increasing the regulating signal rather than decreasing it and thus insuring that the regulated quantity or process, e.g., speed of material, will decrease in magnitude.

A compensating circuit arrangement has been provided for obtaining the true regulating signal from the transducer arrangement in the presence of power applied to produce torque wherein a regulating signal is not effected by the power flow. The speed metering arrangement has been compensated by connection in the bridge circuit so that it will indicate the true signal of the transducer uneffected by the power flow in producing the torque in a regulating signal coupling source. Further arrangement has been provided in the feedback signal circuit from the transducer to the motor field by the blocking rectifier arrangement in series with the control winding to insure a minimum conduction to the motor field which can be adjusted by a constant bias applied to a control winding of the self-saturating reactor limiting the coiling or wind-up motor speed and thus preventing the runaway of the motor 7, in event of absence or breakage of the material being coiled.

Measurement system

To gain adequate tachometer signal voltage provision was made for a speed increase of 20 to 1 between the measuring roll and the tachometer motor 6 by providing sufficient armature current from the excitation supply source 10 to compensate for the loss in the mechanical linkage in a stepdown direction. By employing worm gearing in the mechanical linkage the power applied to the tachometer motor 6 for stepup in speed by the measuring roll 4 avoided locking instead of rotating as when torque is applied at the low speed shaft. However, the friction multiplying effect in the worm gearing arrangement causing the locking or snubbing effect produces an additional advantage, namely: with the motor driving at the high speed gear input a very light retardation of the roll by the material will produce a greatly multiplied percent of retardation at the tachometer motor 6 whereby the tendency of the material to slip, at the measuring roll 4, is minimized.

The tachometer motor 6 is supplied with field excitation from the D.C. excitation supply 10, including an A.C. supply and bridge rectifier, through the ballast resistor 36 upon closure of the run switch 37 including switch armature 38. The tachometer motor armature 42 is geared to rotate at a speed proportional to the length of material 3 so that the generated E.M.F. produces a reference signal voltage which is a measure of the material speed.

To insure operation of the tachometer 6 without slip and with a minimum requirement of force at the driving roll, a preset small armature current is supplied to the tachometer motor which is adjusted by the tachometer torque potentiometer 8 to produce a slight motoring effect wherein the material is required to exert only a small retardation of the roll to maintain precision of material speed measurement. The loss of retarding force, such as when the material has run out at the end of the roll, permits the tachometer armature 42 to accelerate, producing an increase in feedback signal to the comparison circuit at the potentiometer 43, whereby an increased feedback slows the coiler motor 7 by an increase in field current in the field winding 12.

Coiler drive operation usually begins with the roll 1 started at the least radius and the motor field weakened to wind up the length of material 3 at the required material speed rate. As coiling progresses the buildup in diameter of roll 1 requires a gradual increase of current in the motor field 12 to slow down the motor armature 13 and hold constant material speed. At the end of the run, the last of the length of material 3 is finally pulled off the uncoiling roll or reel 2. With a conventional line speed measuring tachometer generator 6, the tachometer driving means is lost and the regulating feedback signal drops to zero requiring a small safety device built into the system to detect the end of the material to stop the drive; since a motor field regulator will weaken the motor field to the limit of its range in response to what appears to be a change in feedback signal calling for an increase in motor speed. In the present system however, the motor tachometer arrangement prevents motor runaway at the end of the coiling operation, for the motoring torque will cause the tachometer to increase in speed in a controlled degree causing a rise in feedback voltage which will actually slow the motor down as the regulator forces the motor field excitation to the maximum limit of its range.

In order to provide the proper amount of tachometer motoring torque, facilitate tuneup, and avoid the necessity of re-adjustment during operations at different line speeds, adjustable compensation has been provided by potentiometer 8 for varying the torque of the tachometer motor 6; potentiometer 9 providing compensation against torque variation resulting from speed changes of the coiler motor 7; resistor 44 introducing voltage variations of the reference divider of the tachometer armature circuit when the torque is adjusted by potentiometer 8. The armature IR drop of the tachometer motor caused by the torque producing current in the tachometer armature circuit produces an error in the counter E.M.F. signal voltage at the motor terminals equivalent to a 5 to 10 f.p.m. increase in line speed. An increase in regulating reference signal equal in amount to the tachometer motor armature IR drop by the reference circuit potentiometer 43 would compensate for the armature IR drop and restore proper operation of the line speed in the adjustment of the tachometer torque, but a re-adjustment or a change would require a new tune-up for each readjustment of the torque potentiometer 8 or for each change of line speed. The compensating bleeding resistor 44 automatically provides the required rise in reference signal in the comparison circuit by conducting a current to the reference divider including resistors 45, 46 and the potentiometer 43 which is proportional to that conducted into the tachometer armature for all settings of the tachometer torque adjusting potentiometer 8.

The tachometer torque compensation potentiometer 9 provides an increasing applied voltage from the armature circuit to the torque potentiometer 8 with increase in operating line speed. By proper adjustment of this torque potentiometer, the motoring torque can be maintained at an optimum small value, over the range of material operating speeds. The resistance of the tachometer armature 42, which would ordinarily introduce an unproportional shift in the compensating comparison circuit operation, produces an equal compensating voltage rise in the coiler motor armature reference divider by the current conducting torque at bleeder resistor 44. Since the current torque at bleeder resistor 44 is drawn from the same source as the tachometer, motoring current compensation equality is not effected by adjustment of the motoring torque.

To maintain the flow of torque current into the tachometer armature 42 as the line speed is increased producing an increased counter E.M.F., the bleeder supply connection is taken from the adjustable tap of the tachometer compensation potentiometer 9 connected between the fixed D.C. excitation supply source and the variable excitation supply 10 to the motor 7. Broadly, proper adjustment of this resistor to provide an increasing component of voltage to be introduced in the tachometer armature circuit, compensates for the rise in tachometer counter E.M.F. with line speed to maintain constant torque. Actually, however, since a somewhat increasing internal torque is required due to increased windage and gear losses of the mechanical linkage at the higher speed, the tachometer compensation potentiometer 9 is adjusted for a rise in current for proper torque at the measurement roll.

Coiler motor circuit

The armature voltage of the motor 7 is provided by the generator 14 in a loop circuit including the motor armature 13, generator armature 16, generator commutator field 17, motor series field 19, motor commutating field 18 and switch armatures 39 and 40 coupled for simultaneous operation. The reference voltage divider circuit including potentiometer 43 and series resistors 45 and 46 are connected across the loop circuit in series with the motor commutating field 18 and series motor field 19, and across the motor armature 13 to produce a reference voltage for the armature 42 of the tachometer motor 6. The field 15 of the generator 14 is connected to the excitation supply 10 at the tap of the potentiometer 50 by the voltage divider including maximum and minimum field potentiometers 48 and 49 respectively. The field 12 of the coiler motor 7 is connected across the load windings 24 and 25 of the magnetic amplifier. The idle and minimum field currents of the coiler motor 7 are controlled by the bias winding 22 of the magnetic amplifier 20 wherein the bias winding 22 is connected between taps of the idle field and minimum field potentiometers 33, 32, in series with the resistor 47 whereby the bias current in the idle field condition is adjusted to approximately the full field until coiler drive is started by closure of switch contacts associated with the switch armatures 38—40.

When the drive is started closure of switch armature 38 lowers the voltage across the bias control winding 22 by an amount determined by the minimum field potentiometer 32 and series resistor 47. The magnetic amplifier is thereafter controlled by the feed back signal through the control winding 23.

Speed comparison circuit

The control winding 23 of the magnetic amplifier 20 is connected between the tachometer motor and the tap of the potentiometer 43 to compare the electrical measurement of material speed provided by the signal voltage of tachometer motor with a reference voltage provided at the adjustable tap of the reference potentiometer 43, adjusted to provide the proper range of speed compensation in combination with the minimum and maximum field settings of the generator exciter source. A rectifier 11 may be connected between potentiometer 43 and the control winding 23 to permit flow of saturating polarity current only through the regulating control winding 23, and any flow of control current in the desaturating direction as a result of loss of tachometer feedback signal due to stalling of the tachometer pilot motor is prevented by the blocking of the rectifier. The motor excitation then can decrease only to the value preset by the minimum field setting of the potentiometer 45 and the bias circuit to limit motor speed. Capacitor 52 may be connected in parallel with the rectifier 11 to filter any ripple generated by the amplifier winding which would otherwise be rectified, thereby facilitating a sharp cutoff action at the current reversal point between the reference voltage tap on potentiometer and the tachometer motor.

The reference voltage at the tap of the potentiometer 43 is a predetermined portion of the coiler motor armature voltage consistent with the rated voltage of the tachometer motor 42 which is a primary consideration in determining the voltage ratio of the reference divider and the position of the tap on the reference voltage potentiometer which may be adjusted for individual tachometer motor variations. A further consideration in the armature reference voltage divider is necessary since no feedback regulation is provided to the generator exciter circuit to provide regulation with load or drift due to temperature or supply voltage variations supplying the field. At the lowest operating line speed of 20 f.p.m., with the generator excitation adjusted to provide 20% rated voltage to the motor armature, variations totalling 20–25% could be expected if the full range of loading rating of the motor are encountered. The field control would be unable to compensate over the desired range of armature circuit variations and would result in weakening of the field to a point where it would lose all torque, break down and short-circuit the generator. The reference voltage divider, therefore, is provided with deregulating compensation both for load current changes and for armature voltage drift, by a reference armature voltage varying with drift in armature voltage and a negative IR component across the commutating fields, to maintain the coiler motor field control operating in its optimum range. The full available range of the magnetic amplifier provided for motor field excitation could then be used for motor speed compensation against coil buildup only, i.e., torque and speed.

During normal operation an increased load on a coiler motor 7 will cause the armature to draw more current introducing a substantial IR drop in the loop circuit lowering the voltage output of the generator 14 and reducing the counter E.M.F. of the motor 7. The decrease in voltage output of the generator 14 is reflected across the reference voltage divider and at the tap of the reference potentiometer 43 lowering the reference voltage to the comparison circuit and the tachometer. Since it is preferable to have the comparison circuit operating in the optimum portion of the magnetic amplifier saturation curve no compensation is desired for changes in speed of the coiler motor 7 due to an increased load and changes in voltages in the loop circuit resulting therefrom. However, since the reference divider circuit is connected across the coiler motor armature 61, the IR drop component due to increased current under load would normally produce a false indication of speed across the divider circuit and at the reference voltage tap to the comparison circuit. To correct for the IR drop within the coiler motor armature and compensate the reference divider circuit to indicate the true counter E.M.F. or speed of the coiler motor, the lower end of resistor 46 of the reference voltage divider is connected between the generator armature 16 and the commutator field 17 including the IR drop of the generator commutating field 17, motor series field 19 and motor commutating field 18 in the reference divider. The IR drop in these windings introduces a negative voltage at the lower end of the reference divider thereby decreasing the reference voltage applied to the comparison circuit at the tap of the reference potentiometer 43 to produce a reference voltage for the comparison circuit which is substantially equivalent to the counter E.M.F. of the coiler motor 7. In providing this deregulation compensation in the comparison circuit for the IR drop of the coiler motor armature 16, the ratio of the IR drop in the commutating and series field to the IR drop in the armature is considered in determining the compensation which is to be applied to the reference divider circuit, whereby a proper indication of coiler motor counter E.M.F. is to be provided at the tap of the reference potentiometer 43, as determined by the reference voltage divider ratio. As a result of the IR compensation in the loop and reference divider circuits, an equivalent reference voltage of armature counter E.M.F. is provided for the comparison circuit to prevent regulation, by the tachometer motor 6 and the measuring circuit, to compensate for speed variations of the coiler motor 7 resulting from deviations in load.

Magnetic amplifier

A magnetic amplifier 20 is employed to vary the excitation in response to changes in the voltage signal received from the tachometer motor which is geared to operate at the speed of the length of the material 3. The signal applied to the amplifier is provided with compensation against changing material speed with coil buildup by increasing the motor field. This compensation is effective over the range of line speeds provided by the adjustable voltage generator exciter controlling the motor armature voltage. Magnetic amplifier load windings 24 and 25 are connected in two legs of the bridge rectifier including rectifiers 27 for supplying rectified power to the motor field.

The amplifier controls the field excitation of the coiler motor by the D.C. signal currents in the three control windings including the positive feedback control winding 21, bias control winding 22, and speed control winding 23. The positive feedback winding 21 is connected across the amplifier output to receive the feedback signal current to control the amplifier output by the smallest change of signal current in the regulating control winding 23 of the comparison circuit. An adjustable resistor may be provided in series with this winding for limiting the amount of feedback thereby maintaining sufficient precision in the bias control pre-settings.

The bias control winding 22 connected between the idle and minimum field limit potentiometers 32, 33, controls the field 12 of the coiler motor for these conditions, wherein the potentiometer 33 adjusts the bias current in idle condition to approximately full field and the potentiometer 32 is adjusted to provide a change to a bias value on closure of switch armature 38 that will insure a minimum rated field conduction of the amplifier, thereby preventing a dangerous rise in motor speed in the event that the regulating signal falls to zero due to loss of tachometer feedback voltage.

The damping circuit including capacitor 31 and coil 30 is connected in parallel with the predetermined portion of the resistor element of the field damping potentiometer 29; also connected between the load windings 24 and 25 to draw charging current from the rectified output of the amplifier to the motor field through the amplifier load windings. The potentiometer 29 is adjusted to provide a desired delay in the amplifier response and rate of motor field change.

Material speed indicator

The speed indicator meter 55 is connected between the resistor 54, tachometer armature 42 and the resistors 57, 58 of the voltage divider network in series with an adjustable calibrating resistor 56 forming a bridge circuit in which the armature, including its own resistance, forms one leg and a small additional resistor 54 in series with the armature forms a second leg. The resistors 57 and 58 form the remaining legs and are selected to have the same resistance ratio, so that the meter is made insensitive to all currents caused by the voltages external to the bridge. The meter than may be properly calibrated by adjustment of resistor 56 to the counter E.M.F. appearing within the bridge. The metering circuit thus provides compensation against adjustment changes in motoring torque current changing meter calibration and is insensitive to the flow of any voltages or currents applied to the extremities of the bridge and can be calibrated to the tachometer motor to indicate material speed by measurement of the true internal counter E.M.F. generated in the motor which occurs within a single leg of the bridge.

Operation

Having the length of material 3 secured to the empty roll or spool 1, windup operation may be started by closing the contacts associated with the armatures 38 to 40 coupled to a switch or other contactor for simultaneous operation as shown. Before closure of the contacts, potentiometer 46, connected across the excitation supply 10, applies an idle field signal current to the bias control winding 22 tending to saturate the core 26 and applying rated field to the coiler motor until the motor drive is started. Switch armature 38 completes the circuit from the excitation supply 10 to the minimum field potentiometer 32. The voltage output is thereby adjusted to change the bias on a control winding 22 to insure only a minimum rated field conduction of the amplifier and prevent dangerous rise in motor speed in the event the regulating signal falls to zero due to loss in feedback voltage.

Switch armature 38 also completes the circuit from the excitation supply 10 to the adjustable voltage divider 48—50 supplying excitation to the field windings 15 of the generator 14; to the field of the tachometer motor 6 through ballast resistor 36; and to the tachometer armature 42 through tachometer compensation potentiometer 9, applying an armature voltage to the tachometer motor 6. Switch armatures 39 and 40 complete the loop circuit of the generator 14 and windup motor 7. Having the system in operation or the motor drive started, a small increase in the tachometer output due to increase in the diameter of the coiled material and resulting rise in material speed, increases saturating signal current flow through the control winding 23; increasing the motor excitation provided by the magnetic amplifier, causing the motor to operate at progressively lower speeds and at the same time increasing the available motor torque required by the pull on increasing coil diameter of the roll 1.

The tachometer motor will drive the measuring roll 4 without slip and with a minimum requirement of force at the roll 4 by the small preset armature current supplied by the tachometer torque potentiometer 8. This produces a slight motoring effect so that the length of material 3 is only required to exert a small retardation of the roll to maintain precision of material speed measurement. In the event the length of the material 3 becomes exhausted on the roll 2 and no longer controls the speed of the measuring roll 4, the loss of retarding force then permits the tachometer motor 6 to accelerate so that the increased feedback through the regulating control winding 23 of the magnetic amplifier increases the strength of the field 12 of the windup motor 7, slowing down the motor instead of permitting it to runaway.

The tachometer compensation potentiometer 9 connected between the excitation supply line 59 and the loop circuit provides an increased applied voltage from the armature circuit of the motor 7 to the torque limiting potentiometer 8 with an increase in operating line speed. This potentiometer may be adjusted to maintain the required small motoring torque over the range of operating speeds of the measuring roll 4. The reference circuit, including the resistors 45 and 46 of the voltage divider, is compensated for the voltage rise in the tachometer motoring circuit, produced by the flow of motoring current to the tachometer armature resistance by a current conducted through the bleeder resistor 44 producing a compensating voltage rise in the armature reference divider preventing an unproportional shift in the compensating reference circuit operation.

With the armature 42 of the tachometer motor 6 rotating at a speed proportional to that of material 3, the generated counter E.M.F. provides to the comparison reference circuit a voltage which is a measure of the material speed. With the tachometer motor driving the mechanical linkage, including the worm gear 5 and spur gear coupled to the measuring roll 4, a light retardation of the measuring roll 4 by the material produces a greatly multiplied loading effect at the tachometer motor thereby controlling the speed. Since the rectifier 11 is placed in the circuit connecting the potentiometer 43 of the comparison circuit with the tachometer armature voltage, a current through the control winding may only tend to saturate the core 26 of the magnetic amplifier 20. The regulation of the tachometer therefore will only tend to strengthen the field of the windup motor 7 by increasing the output of the magnetic amplifier 20, preventing a loss of field excitation in case of tachometer failure. The feedback control winding 21 receives a positive feedback current from the amplifier output permitting greater sensitivity of the regulating control winding 23 in the comparison circuit. The supply for the load windings 24 and 25 is provided by alternating current source 28 connected between the pairs of rectifiers in the magnetic amplifier output circuit, as shown in the drawings.

The windup motor field regulator circuit is compensated for load current changes or other deregulating effects in the loop circuit to retain operation in its optimum range by compensating the reference voltage in the armature voltage divider to vary with drift in armature voltage by including a negative IR component across the commutating fields; thus deliberately deregulating to permit the regulated line speed of the material 3 to vary exactly as much as would the speed of the motor operated with constant field strength under the same conditions. The motor field excitation range is thereby applied only to motor speed compensation against coil buildup of the roll 1.

Reviewing the above description, it will be readily apparent that an extremely simple and inexpensive circuit has been provided for regulating the torque and speed of a motor, eliminating many components heretofore considered necessary and thereby reducing the total equipment cost while retaining and improving all the control functions.

While a preferred embodiment of the invention has been specifically disclosed, it is understood that the invention is not limited thereto, as many variations will be readily apparent to those skilled in the art and the invention is to be given its broadest possible interpretation within the terms of the following claims.

I claim:

1. A transducer system comprising in combination; a D.C. motor including a motor armature and field, an element capable of being moved, means for mechanically coupling said element to said armature whereby the speed of said element is converted to rotational speed at said armature, a D.C. supply source, circuit means connecting said motor to said source and controlling the voltage applied thereto to rotate said motor armature at a speed tending to accelerate said element, said mechanical linkage being responsive to the retarding force of the element to produce an amplified retarding force exceeding the motor torque whereby the armature speed is maintained proportional to the speed or movement of said element.

2. Measuring apparatus and circuit means comprising; a D.C. motor including a motor armature and field, a length of material capable of being moved, means for mechanically coupling said material to said armature whereby the speed of said material is converted to rotational speed at said armature, a D.C. supply source, circuit means connecting said motor to said source and controlling the voltage applied thereto to rotate said motor armature at a speed tending to accelerate said material, said mechanical linkage being responsive to the retarding force of the element to produce an amplified retarding force exceeding the motor torque whereby the armature speed is proportional to the speed or movement of said element as determined by the mechanical linkage.

3. A transducer system comprising in combination a transducer for converting the motion of an object into a voltage signal output directly proportional to the speed of said object, a mechanical linkage including a spur gear coupled to said object and to a worm gear coupled to said transducer, a D.C. power supply source, circuit means connecting said source to said transducer and limiting the power to slightly more than the power losses of the transducer and the mechanical linkage, to produce a driving force on said object, said object being responsive to said driving force to produce a retarding force on said spur gear wherein said spur gear and worm gear amplify the retardation, said transducer being responsive to said retardation to move at a speed determined by the stepup speed ratio of the mechanical linkage and produce a signal output voltage which is a measure of the speed of said object.

4. Measuring apparatus and circuit means including a transducer for producing an output signal voltage which is proportional to movement or speed comprising; a D.C. motor including a motor armature and a field, an element capable of being moved, means for mechanically coupling said element to said armature including a spur gear coupled to said element and a worm gear coupled to said armature whereby the speed of said element is stepped up and converted to rotational speed at said armature, a D.C. supply source, circuit means connecting said motor to said source and controlling the voltage applied thereto to rotate said motor armature, at a speed tending to accelerate said element, said element being responsive to the armature torque to produce a retarding force, due to snubbing between the spur and worm gears in the stepup speed direction, exceeding the motor torque at motor speed whereby the motor counter E.M.F. is directly proportional to the speed or movement of said element and circuit means for detecting the counter E.M.F. of said motor to produce an output signal voltage.

5. A motor control system comprising; a D.C. driver motor including a motor armature and field, a windup roll coupled to the armature of said motor, an unwind roll, a length of material coupled to said rolls, a measuring roll engaging said length of material, a transducer having a mechanical input and a voltage output which is a function of the speed of said input, a mechanical linkage coupling said measuring roll to said transducer input, at least one D.C. power supply source, a power circuit for coupling said source to the driver motor and the transducer including a regulator circuit for controlling the speed and torque of said motor, said regulator including circuit means for deriving a control signal by comparing the voltage output of said transducer and a portion of the motor counter E.M.F. as determined by the relative voltage outputs of the motor and transducer; and an amplifier for amplifying only the difference and applying said amplified control signal to said motor.

6. A motor control system comprising; a D.C. driver motor including a motor armature and field, a windup roll coupled to the armature of said motor, a length of material coupled to said roll, a measuring roll engaging said length of material, means for playing out said material to resist the windup roll, a transducer having a mechanical input and a voltage output which is a function of the speed of said input, a mechanical linkage coupling said measuring roll to said transducer input, at least one D.C. power supply source, a power circuit for coupling said source to the driver motor and the transducer including a regulator circuit for controlling the speed and torque of said motor, said regulator including circuit means for deriving a control signal by comparing the voltage output of said transducer and a portion of the motor counter E.M.F. as determined by the relative voltage outputs of the motor and transducer; and an amplifier for amplifying only the difference and applying said amplified control signal to the field of said motor to control the speed of said armature.

7. A motor control system comprising; a D.C. driver motor including a motor armature and field, a windup roll coupled to the armature of said motor, an unwind roll, a length of material coupled to said rolls, a measuring roll engaging said length of material, a transducer having a mechanical input and a voltage output which is a function of the speed of said input, a mechanical linkage including spur and worm gears coupling said measuring roll stepping up the speed ratio to said transducer input, at least one D.C. power supply source, a power circuit for coupling said source to the driver motor and said transducer including a regulator circuit for controlling the speed and torque of said motor, said regulator including circuit means for minimizing the difference in the voltage output of said transducer and a portion of the motor counter E.M.F., as determined by the relative voltage outputs of the motor and transducer by applying said difference to an amplifier to produce an amplified control signal and applying said control signal to the field of said motor.

8. In a motor control system, a D.C. motor including a motor armature field and at least one additional field, a D.C. power supply source, a power supply circuit for connecting said source to said motor, reference voltage circuit means connected across said armature and additional field providing a reference voltage varying with motor speed, complementary circuit means connected to a point between said armature and additional field for deriving a signal voltage proportional to the speed of said motor.

9. In a motor control system, a D.C. motor including a motor armature, field, and at least one additional field in series with said armature; a D.C. power supply source; circuit means for connecting said source to said motor to provide driving power, and across said armature and additional field; reference circuit means connected across said armature and additional field for providing a reference voltage; complementary circuit means connected across a portion of said reference circuit and to a point between the motor armature and additional field for deriving a signal voltage which is a portion of the counter E.M.F. of said motor.

10. In a motor control system, a D.C. motor including a motor armature, field, and at least one additional field in series with said armature, a D.C. power supply source; circuit means connecting said source across said armature and additional field to provide driving power, reference circuit means connected across said armature and additional field for providing a motor speed reference voltage; comparison circuit means connected across a portion of said reference circuit and a point between the motor armature and additional field for deriving a signal voltage which is at least a portion of the counter E.M.F. of said motor, a transducer mechanically coupled to said motor producing a voltage which is a function of motor speed, field circuit means including an amplifier for coupling said source to said field; said comparison circuit means including circuit means for comparing said motor reference voltage and transducer voltage to produce a control signal; and a control circuit for coupling said control signal to said amplifier to control the speed of said motor.

11. In a transducer system for measuring the speed of an object, a meter circuit for indicating the speed of said object comprising; a current meter connected in series with an adjustable calibrating resistor across a bridge circuit, a D.C. motor including an armature, a D.C. power source, circuit means connecting said source to said armature, a compensating resistor connected in series with said armature to form two legs of said bridge, a pair of resistors connected in series, to form a voltage divider and the remaining legs of said bridge, having the same resistance ratio as the compensating resistance and armature and connected in parallel therewith, said meter and calibrating resistor being connected to a point between the series resistors forming the voltage divider and a point between the armature and compensating resistor whereby the meter is insensitive to voltage external of the bridge and adjusted by the calibrating resistor, to measure the counter E.M.F. of the motor.

12. The combination as set forth in claim 5 wherein the regulator circuit includes means arranged for compensating the regulator for power applied to the transducer.

13. The combination as set forth in claim 5 wherein the amplifier includes a control winding in circuit with the regulator and the circuit to the control winding includes a rectifier which is arranged to prevent desaturating current flow in the amplifier for assuring a minimum amplifier output.

14. A control system comprising; a driving means for driving a load including a moving strip, an electrically powered transducer, a source of electric power, circuit means connecting said source to said transducer, a mechanical linkage of relatively high loss mechanically connecting said transducer to said strip said circuit means including means limiting the electrical power delivered to said transducer from said source to slightly more than the electrical and mechanical power losses of the transducer and the mechanical power losses of said linkage so the strip is partly moved by the transducer, control means for controlling the power output of said driving means, and means connected to the transducer for causing the control means to be responsive to the amount of power exerted by the transducer through the mechanical linkage to move the strip.

15. The control system of claim 14 characterized in that an additional means is provided for varying the power output of said driving means and the circuit means includes means for co-ordinating the power delivered to said transducer with different power outputs of said driving means.

References Cited in the file of this patent

UNITED STATES PATENTS

| | | |
|---|---|---|
| 2,485,757 | Michel | Oct. 25, 1949 |
| 2,550,104 | Allbert | Apr. 24, 1951 |
| 2,677,080 | Halter | Apr. 27, 1954 |